United States Patent [19]
Kobayashi

[11] Patent Number: 5,090,751
[45] Date of Patent: Feb. 25, 1992

[54] LATCHING DEVICE FOR USE ON A VEHICLE

[75] Inventor: Yasutomo Kobayashi, Yokohama, Japan

[73] Assignee: Nifco Inc., Kanagawa, Japan

[21] Appl. No.: 753,380

[22] Filed: Aug. 30, 1991

[30] Foreign Application Priority Data

Sep. 4, 1990 [JP] Japan ................ 2-232560

[51] Int. Cl.$^5$ ................................ E05C 19/02
[52] U.S. Cl. ................ 292/71; 292/DIG. 4; 292/DIG. 22; 292/210
[58] Field of Search ........... 292/83, 153, DIG. 4, 292/DIG. 22, 71, 210

[56] References Cited

U.S. PATENT DOCUMENTS 4,660,871  4/1987  Arakawa et al. ....... 292/DIG. 4 X
5,035,451  7/1991  Brady ................. 292/DIG. 22 X

*Primary Examiner*—Richard E. Moore
*Attorney, Agent, or Firm*—Kanesaka and Takeuchi

[57] ABSTRACT

A latching device for a vehicle comprises a hollow casing having open front and rear ends, a latching member supported for sliding motion within the casing so as to protrude through the open front end of the casing, biasing means for biasing the latching member toward the open front end so that the latching member protrudes outside through the open front end of the casing, a locking mechanism capable of locking the latching member at a locking position within the casing against the biasing force of the biasing means and of unlocking the latching member when the latching member is pushed from the locking position against the biasing force of the biasing means to an unlocking position within the casing, and a safety mechanism capable of preventing the disengagement of the locking mechanism by inertia. The locking mechanism comprises a locking lever that engages a heart-shaped cam groove formed in the latching member, and the safety mechanism comprises a movable member pivotally supporting the locking lever, supported for sliding movement within the casing and capable of moving in the direction of movement of the latching member by inertia, and spring means for biasing the movable member toward the latching member.

17 Claims, 9 Drawing Sheets

LATCHING DEVICE FOR USE ON A VEHICLE

BACKGROUND OF THE INVENTION AND RELATED ART

The present invention relates to a latching device for use on a vehicle and, more particularly, to a latching device provided with a locking mechanism and a safety mechanism capable of acting by inertia to prevent the locking mechanism being undone when the vehicle collide against an obstacle.

A conventional latching device of for such a use comprises a casing having an opening, a latching member supported for sliding in the casing so as to be inserted in and removed from the casing through the opening, urging means for urging the latching member so that the latching member projects from the casing, and a locking mechanism which locks the latching member at a locking position within the casing against the urging force of the urging means and capable of being undone when the latching member is pushed to an unlocking position within the casing. Such a latching device is disclosed in, for example, Japanese Utility Model Laid-open (Kokai) Nos. Sho 60-11977, Sho 61-163870, Sho 61-176373, Sho 63-199140 and Hei 1-163682.

Storing devices for vehicles, provided with a safety mechanism capable of preventing a locking mechanism being undone by inertia are disclosed in, for example, Japanese Patent Laid-open (Kokai) No. Sho 64-41434 and Japanese Utility Model Laid-open (Kokai) No. Hei 2-25332.

Two types of known safety mechanisms have been used in combination with different locking mechanisms, respectively.

The locking mechanism for the former storing device disclosed in Japanese Patent Laid-open (Kokai) No. Sho 64-41434 employs a grooved cam provided with a heart-shaped cam groove, and a locking lever controlled by the grooved cam. A safety mechanism combined with this locking mechanism comprises a movable member that is able to be moved into the range of turning motion of the locking lever by inertia, and spring means for urging the movable member outside the range of turning motion of the locking lever.

The locking mechanism for the latter storing device disclosed in Japanese Utility Model Laid-open No. Hei 2-25332 employs a hook member, and a locking pin that engages the hook member. A safety mechanism combined with this locking mechanism comprises a movable member capable of being moved into the range of turning motion of the hook member by inertia, and spring means urging the movable member outside the range of turning motion of the hook member.

However, it is difficult to miniaturize a latching device incorporating the conventional safety mechanism.

The safety mechanism disclosed in Japanese Patent Laid-open (Kokai) No. Sho 64-41434 needs to dispose the movable member beside the locking lever, which increases the width of the latching device.

Since the cam groove of the locking mechanism extends under the pivot on which the locking lever turns, it is difficult to dispose the pivot and the locking mechanism has a complicated construction.

The locking mechanism disclosed in Japanese Utility Model Laid-open (Kokai) No. Hei 2-25332 is unsuitable for use in combination with a small latching device because the hook member must be turned through a comparatively large angle.

Accordingly, it is an object of the present invention to provide a latching device of a simple construction having a reduced size, provided with a locking mechanism of a reduced size employing a locking lever pivotally supported on a movable member, and a grooved cam provided with a heart-shaped cam groove for controlling the locking lever.

A sliding movable member employed in both the foregoing known safety mechanisms needs a guide member having a guide surface for guiding the movable member for sliding movement, and frictional resistance opposing the relative motion between the movable member and the guide member is liable to impede the movement of the movable member.

Accordingly, another object of the present invention is to provide a latching device of a simple construction having a reduced size, employing a movable member pivotally supported within a casing so as to restrain a latching member directly from backward movement and to prevent damaging a locking mechanism, having high reliability, and capable of satisfactorily responding to inertial force.

SUMMARY OF THE INVENTION

A latching device in a first aspect of the present invention incorporates a safety mechanism comprising a movable member pivotally supporting a locking lever and supported for sliding motion in the direction of sliding movement of a latching member within a casing so as to be moved by inertia in the direction of movement of the latching member, and biasing means for biasing the movable member toward the latching member.

When inertial force acts on the latching device, the latching member moves backward from a locking position to an unlocking position against the force of biasing means, such as a compression spring. At the same time, the movable member is moved backward within the casing in the direction of backward movement of the latching member against the resilient force of the spring means. Since the position of the locking lever relative to a cam groove remains unchanged, the locking device remains in a locking state.

A latching device in a second aspect of the present invention incorporates a safety mechanism comprising a movable member pivotally supported for swing motion within a casing so as to be brought into engagement with and disengaged from a latching member to restrain the latching member from movement from a locking position to an unlocking position, and spring means for biasing the movable member away from the latching member.

When inertial force acts on the latching device, the latching member tends to move backward from the locking position toward the unlocking position against the biasing force of a biasing means and, at the same time, the movable member is turned on a pivot provided on the casing and engages the latching member to restrain the latching member from movement from the locking position toward the unlocking position and, consequently, the locking device remains in its locking state.

BRIEF DESCRIPTION OF THE DRAWINGS

FIGS. 1 to 10 show a latching device in a first embodiment according to the present invention suitable for use on a vehicle, in which:

FIGS. 11 and 12 show a latching device in a second embodiment according to the present invention, in which:

DETAILED DESCRIPTION OF THE PREFERRED EMBODIMENTS

Referring to the drawings, a latching device 10 is combined with a sliding ashtray or a sliding container provided on the instrument panel, not shown, of an automobile. The latching device 10 engages the striker 20 of the sliding ashtray or the sliding container.

Figure 2:
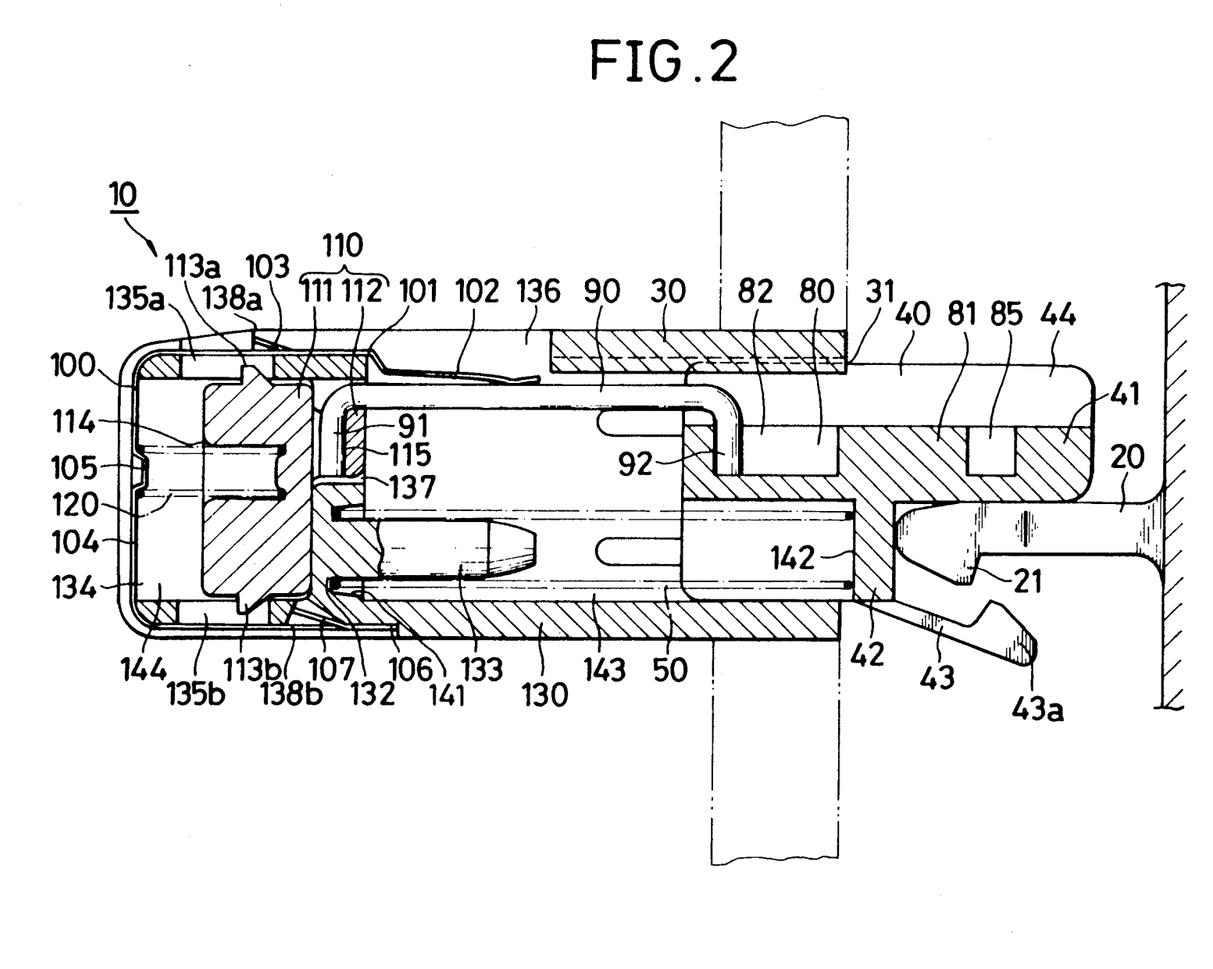
FIG. 2 is a longitudinal sectional view of an essential portion of the latching device in an unlocking state.
Figure 3:
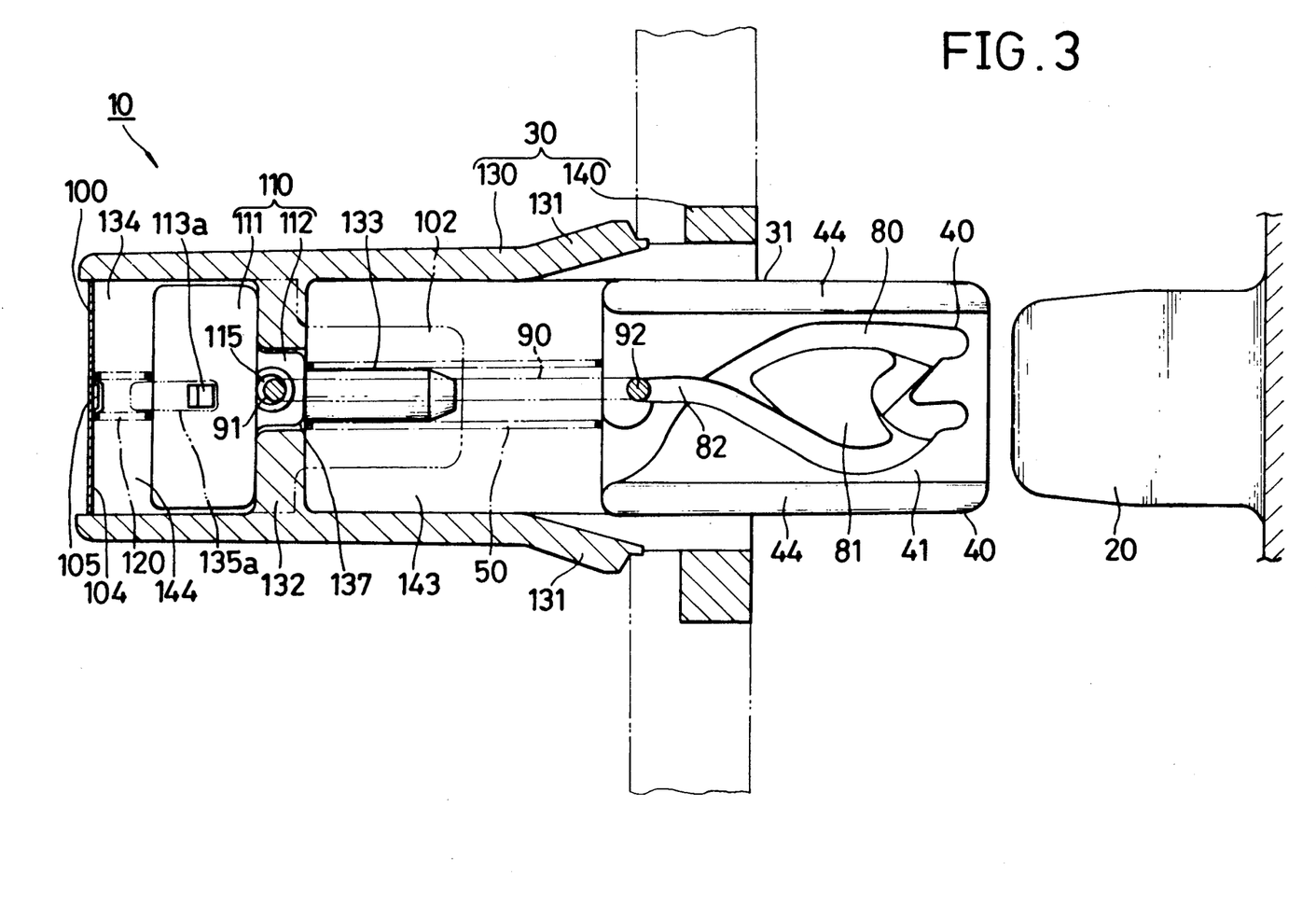
FIG. 3 is a cross-sectional view taken in FIG. 2.

As shown in FIGS. 2 and 3, the latching device 10 comprises, as principal components, a hollow casing 30 having an open front end 31, a latching member 40 inserted through the open front end 31 in the casing 30 and supported for sliding in the casing 30, a compression spring 50, i.e., biasing means, biasing the latching member 40 so that the latching member 40 project outside the casing 30 through the open front end 31, a locking mechanism 60 for locking the latching member 40 at a locking position (FIGS. 9 and 10) in the casing 30 against the resilience of the compression spring 50 and for unlocking the latching member 40 when the latching member 40 is pushed to an unlocking position in the casing 30 against the resilience of the compression spring 50, and a safety mechanism 70 which holds the locking mechanism 60 in a locking state when inertial force acts on the latching device 10.

As shown in FIGS. 2 and 3, the locking mechanism 60 comprises a locking lever 90 having an outer end 92 engaging a heart-shaped cam groove 80 formed in the upper surface of a latching member 40, and a holding spring 100, i.e., holding means, pressing the outer end 92 of the locking lever 90 toward the bottom surface of the cam groove 80.

As shown in FIGS. 2 and 3, the safety mechanism 70 comprises a slider 110, i.e., a movable member, pivotally supporting the locking lever 90 at its rear end 91, supported for sliding movement in the direction of sliding movement of the latching member 40 in the casing 30 and capable of being moved by inertial force in the direction of movement of the latching member 40, and a spring 120, i.e., spring means, biasing the slider 110 toward the latching member 40.

Referring to FIGS. 2 and 3, the casing 30 has a body 130 having the shape of a rectangular tube, and flanges 140 extending outward respectively from the outer surfaces of the side walls of the body 130 at the open front end 31. The casing 30 is formed of a thermoplastic resin having moderate rigidity and elasticity in an integral unit.

As shown in FIG. 3, the body 130 of the casing 30 is provided on the outer surfaces of the side walls thereof with a pair of elastic stopper 131, which extends slopewise toward the backsides of the flanges 140. The casing 30 is held on the instrument panel, not shown, by the elastic stoppers 131 and the flanges 140 so as to extend behind the instrument panel.

As shown in FIGS. 2 and 3, the interior of the body 130 of the casing 30 is divided into a front chamber 143 on the side of the open front end 31, and a rear chamber 144 by a partition wall 132. The latching member 40 is received slidably in the front chamber 143, and the slider 110 of the safety mechanism 70 is received slidably in the rear chamber 144. A projection 133 projects toward the front from the front surface of the lower portion of the partition wall 132, and the compression spring 50 is put on the projection 133.

Referring to FIGS. 2 to 8, the latching member 40 has an upper flat portion 41 provided in its upper surface with the cam groove 80, a holding portion 42 extending downward from the lower surface of the rear half of the flat portion 41 in a shape resembling a U-shaped frame opening toward the rear so as to receive the front end of the compression spring 50, and an elastic catch 43 having a U-shaped front portion, extending obliquely toward the front from the lower surface of the flat portion 41 so as to extend obliquely downward beyond a plane including the outer surface of the bottom wall of the casing 30. The latching member 40 is formed of a thermoplastic resin having moderate rigidity and elasticity in an integral unit.

Figure 5:
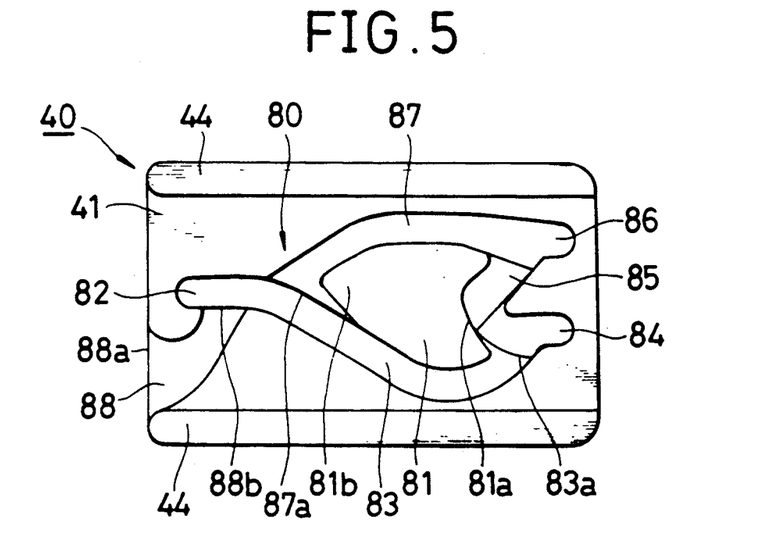
FIG. 5 is a plan view of the latching member of FIG. 4.
Figure 6:
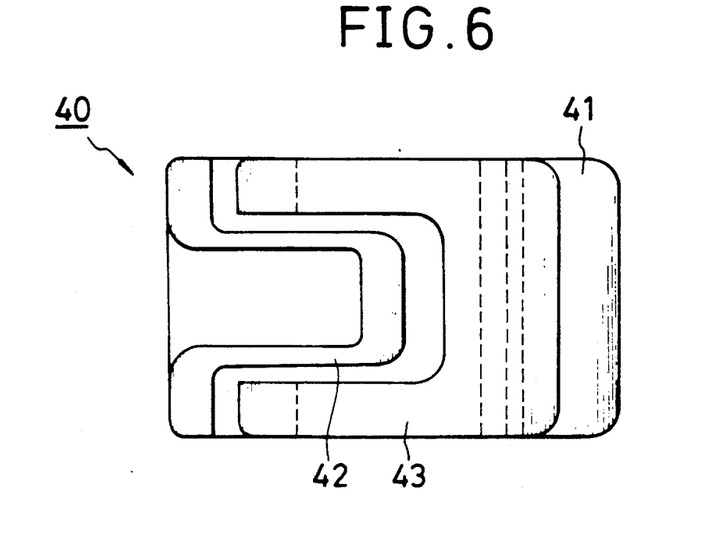
FIG. 6 is a bottom view of the latching member of FIG. 4.
Figure 7:
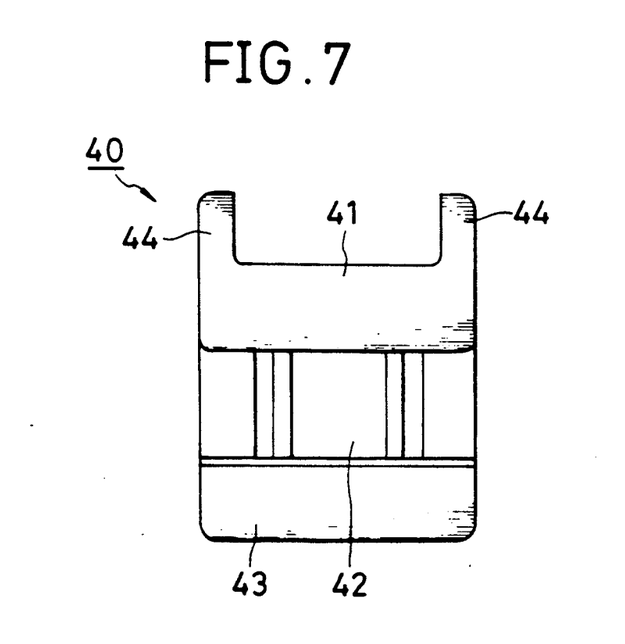
FIG. 7 is a front view of the latching member of FIG. 4.

As shown in FIGS. 5 and 7, the flat portion 41 has a pair of flanges 44 extending upward from the opposite side edges thereof. When the latching member 40 is inserted in the casing 30, the upper edges 44 of the flanges 44 are in sliding contact with the inner surface of the upper wall of the casing 30.

As shown in FIG. 5, the heart-shaped cam groove 80 formed in the upper surface of the flat portion 41 defines a heart-shaped land 81. The heart-shaped land 81a has a concave, U-shaped front end 81a, and a convex, V-shaped rear end 81b. The cam groove 80 consists of a lead-in section 82 substantially linearly extending toward the front to the V-shaped rear end 81b of the heart-shaped land 81, a first section 83 extending toward the front in a curve from the lead-in section 82 and reducing its depth toward its front end 83a, a returning section 84 extending from the shallowest front end 83a of the first section 83 beyond the U-shaped front end 81a of the heart-shaped land 81, having a depth greater than that of the shallowest front end 83a of the first section 83, and having a closed front end, a locking section 85 having a shape conforming to the U-shaped front end 81a of the heart-shaped land 81 and a depth greater than that of the returning section 84, contiguous with the returning section 84, an escaping section 86 contiguous with the locking section 85, having a depth greater than that of the locking section 85, extending toward the front beyond the U-shaped front end 81a of the heart-shaped land 81, and having a closed front end, and a second section 87 extending from the escaping section 86 toward the lead-in section 82 in a curve on the other side of the heart-shaped land 81 and reducing its depth toward its rear end. A guide groove 88 branches from the middle of the lead-in section 82. The rear end 88a of the guide groove 88 opens in the rear end of the latching member 40, and the front end 88b of the same joins to the middle of the lead-in section 82. The depth of the front end 88b is smaller than that of the lead-in section 82.

Figure 4:
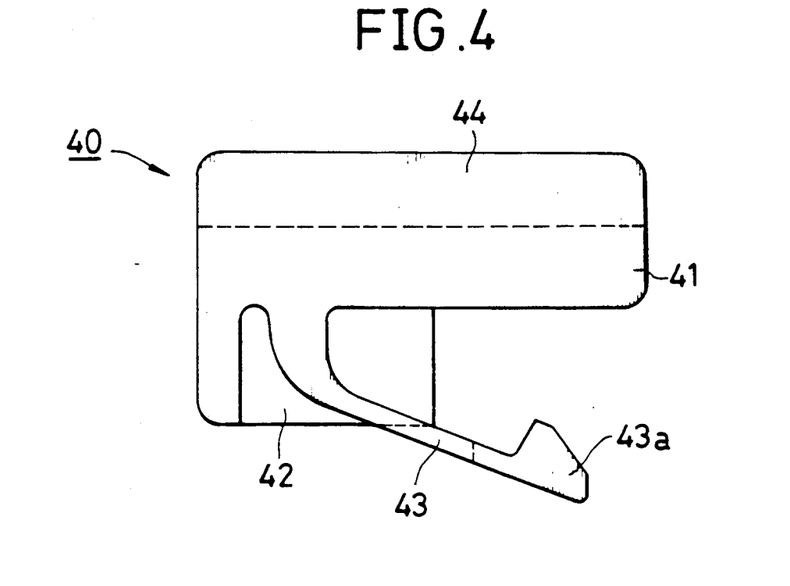
FIG. 4 is a side view of a latching member.

A hook 43a having an upper surface declining to the front is formed in the front end of the elastic catch 43 as best shown in FIG. 4. Formed in the extremity of the striker 20 is a hook 21 having a shape complementary to that of the hook 43a of the elastic catch and having a lower surface declining toward the front as shown in FIG. 2. The hook 43a of the elastic catch 43 and the hook 21 of the striker engage each other.

As shown in FIGS. 2 and 3, the locking lever 90 is a round metal wire. The opposite ends of the locking lever 90 are bent downward substantially in the a shape resembling the letter L. The rear end 91 of the locking lever 90 is supported pivotally on the slider 110, and the front end 92 of the same is received in the cam groove 80.

As shown in FIGS. 2 and 3, the slider 110 of the safety mechanism 70 is formed of a metal so that the slider 110 is comparatively heavy. The slider 110 has a rear portion 111 received for sliding movement in the rear chamber 144 of the body 130 of the casing 30, and a front portion 112 protruding to the front from the upper portion of the front surface of the rear portion 111 and pivotally supporting the locking lever 90 at its rear end 91. Guide projections 113a and 113b having the shape of a sawtooth project in opposite directions from the upper and lower surfaces of the rear portion 111 of the slider 110, respectively. The front surface of each of the guide projections 113a and 113b is declined to the front. A recess 114 is formed in the rear surface of the slider 110 to receive the front end of the coil spring 120. The front portion 112 of the slider 110 is provided with a vertical through hole 115 having a diameter greater than that of the rear end 91 of the locking lever 90. The rear end 91 of the locking lever 90 is received in the through hole 115 so that the locking lever 90 is able to turn about the through hole 115 and is able to incline relative to the slider 110.

As shown in FIGS. 2 and 3, the open rear end 134 of the body 130 of the casing 30 is closed by the holding spring 100 after inserting the slider 110 through the open rear end 134 in the rear chamber 144. Longitudinal Guide slots 135a and 135b are formed in the upper and lower walls of the body 130 of the casing 30 to receive the guide projections 113a and 113b slidably therein, respectively.

As shown in FIG. 2, an opening 136 opening into the front chamber 143 is formed in the upper wall of the body 130 of the casing 30. The front portion of the holding spring 100 extends through the opening 136 to depress the locking lever 90. An opening 137 is formed in the upper central portion of the partition wall 132 of the body 130 of the casing 30 as shown in FIG. 2 and 3. The front portion 112 of the slider 110 is received in the opening 137, and the chambers 143 and 144 communicates with each other by means of the opening 137.

The holding spring 100 is formed of a metal and has a U-shaped cross section conforming to the rear end of the body 130 of the casing 30 as shown in FIGS. 2 and 3. As best shown in FIG. 2, a pressing portion 102 for depressing the locking lever 90 is formed in the front portion of the upper tongue 101 of the holding spring 100. A middle portion of the upper tongue 101 is raised to form a lug 103. A protrusion 105 having a U-shaped cross section is formed in the rear portion 104 of the holding spring 100 so as to protrude into the rear chamber 144 of the casing 30 toward the recess 114 of the slider 110. The rear end of the coil spring 120 is put on the protrusion 105. As shown in FIG. 2, a middle portion of the lower tongue 106 is raised to form a lug 107 similar to the lug 103 of the upper tongue 101.

As shown in FIG. 2, shoulders 138a and 138b are formed on the inner surfaces of the upper and lower walls of the body 130 of the casing 30, respectively. The lugs 103 and 107 engage the shoulders 138a and 138b, respectively.

As mentioned above, the coil spring 120 of the safety mechanism 70 is compressed between the recess 114 of the slider 110 and the protrusion 105 of the holding spring 100 to bias the slider 110 toward the partition wall 132 of the body 130 by its resilience. An inertial force that moves the slider 110 is dependent on the spring constant of the coil spring 120. In this embodiment, the inertial force capable of moving the slider 110 is, for example, on the order of 30 G, so that the slider 110 will not move even if the vehicle is accelerated or decelerated at a very high rate.

A procedure of assembling the latching device 10 will be described hereinafter.

The rear end 91 of the locking lever 90 is inserted from above in the through hole 115 of the slider 110, and then the slider 110 is inserted through the open rear end 134 of the body 130 of the casing 30 in the rear chamber 144. In inserting the slider 110 in the body 130 of the casing 30, the guide projections 113a and 113b of the slider 110 come into contact with the upper and lower edges of the open rear end 134 of the body 130. The slider 110 is pushed hard to deform the open rear end 134 of the body 130 slightly in vertical directions by the inclined front surfaces of the guide projections 113a and 113b so that the guide projections ride over the edges of the open rear end 134 and plunge into the guide slots 135a and 135b, respectively, as shown in FIGS. 2 and 3. Then, the body 130 restore its original shape elastically.

Figure 1:
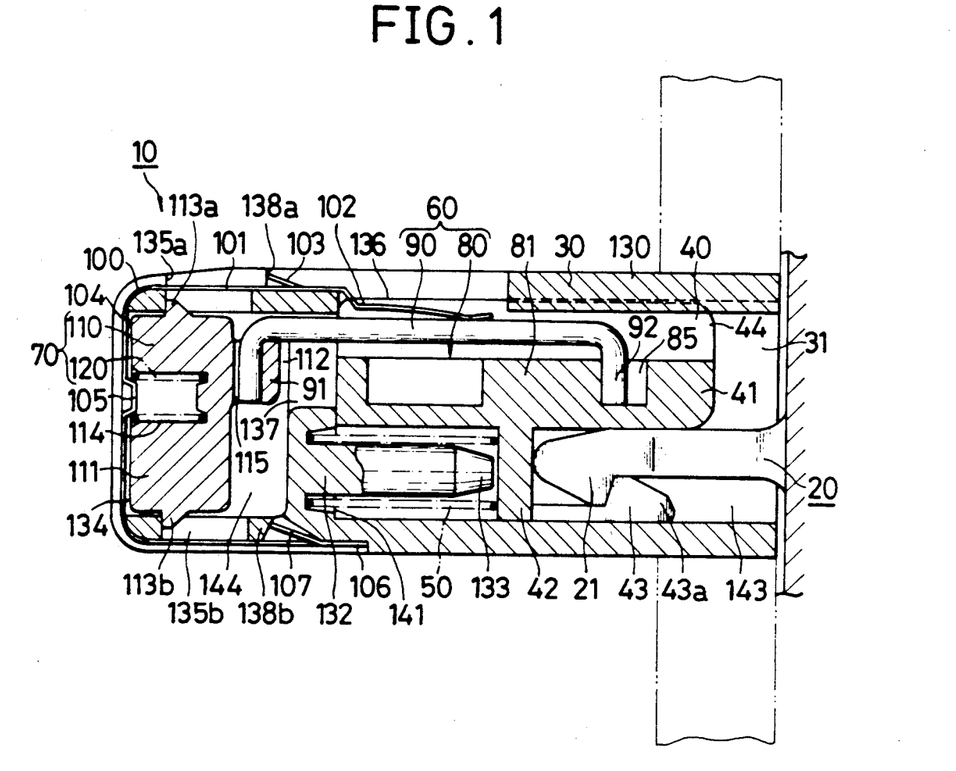
FIG. 1 is a longitudinal sectional view of an essential portion of the latching device in a state subjected to the action of inertial force.
Figure 10:
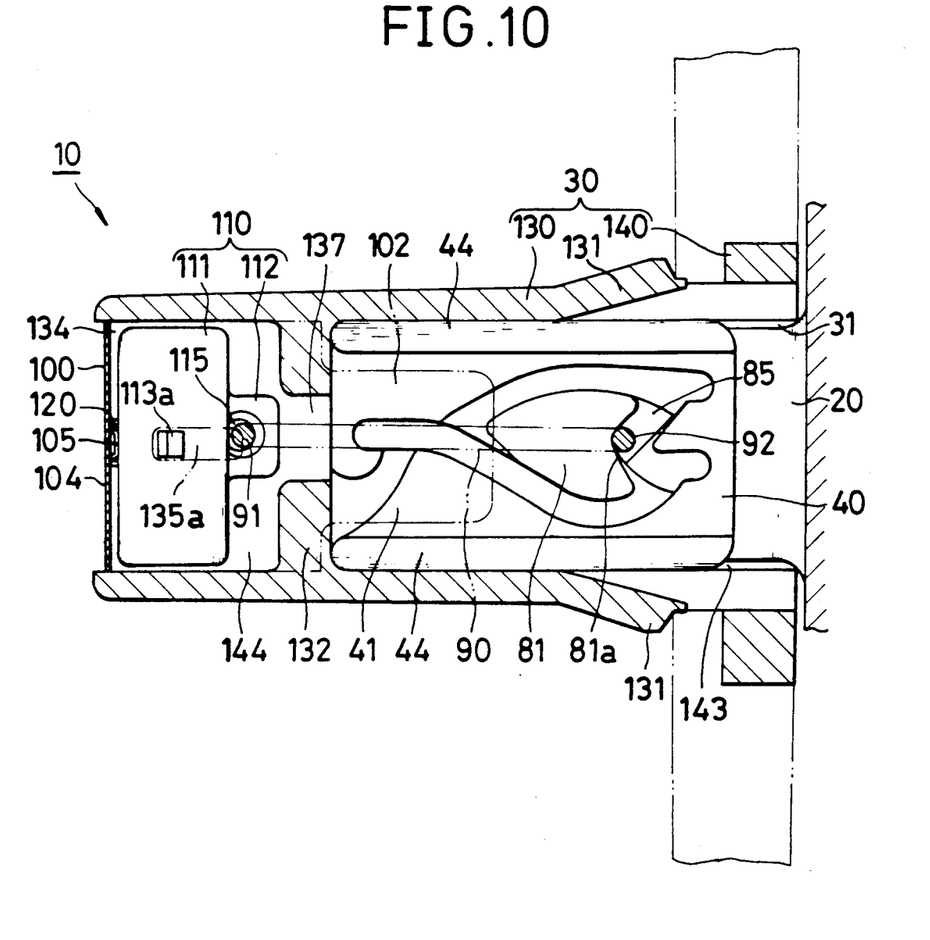
FIG. 10 is a cross sectional view taken in FIG. 1.

The slider 110 thus fitted in the rear chamber 144 of the body 130 slides longitudinally with its guide projections 113a and 113b being guided by the guide slots 135a and 135b of the body 130, respectively. The slider 110 is stopped at a frontmost position with its front surface in contact with the rear surface of the partition wall 132 as shown in FIGS. 2 and 3. The slider 110 is stopped at a rearmost position with the guide projections 113a and 113b in contact with the rear ends of the guide slots 135a and 135b, respectively, as shown in FIGS. 1 and 10. The distance of sliding movement of the slider 110 is approximately equal to the over stroke of the latching member 40, namely, the distance between the locking position and the unlocking position of the latching member 40.

The locking lever 90 projects through the opening 137 of the partition wall 132 into the front chamber 143 so that the front end 92 of the same is in the front chamber 143 as shown in FIG. 2 and 3.

Then, the compression spring 50 is inserted through the open front end 31 of the casing 30 in the front chamber 143 to put the compression spring 50 on the projection 133 with one end thereof received in an annular recess 141 surrounding the projection 133.

Then, the latching member 40 is inserted through the open front end 31 of the casing 30 in the front chamber 143 so that the front end 92 of the locking lever 90 extending in the front chamber 143 is received in the rear end 88a of the guide groove 88. As the latching member 40 is pressed into the front chamber 143, the front end 92 of the locking lever 90 moves relative to the latching member 40 along the guide groove 88 and falls from the front end 88b of the guide groove 88 into the lead-in section 82 of the cam groove 80. Once the front end 92 of the locking lever 90 falls in the lead-in section 82 of the cam groove 80, the front end 92 of the locking lever 90 is unable to return to the guide groove 88 because the lead-in section 82 is deeper than the front end 88b of the guide groove 88.

The front end of the compression spring 50 is received in the holding portion 42 of the latching member 40. The compression spring 50 is compressed between the rear surface 142 of the bottom wall of the holding portion 42 and the front surface of the partition wall 132 of the body 130 of the casing 30 as shown in FIG. 2. Accordingly, the latching member 40 is urged by the resilience of the compression spring 50 so as to project outside the casing 30 through the open front end 31 of the casing 30. The latching member 40 is restrained from projection beyond a front most position by the engagement of the front end 92 of the locking lever 90 with the rear end of the lead-in section 82 of the cam groove 80.

Finally, the front end of the spring 120 is put in the recess 114 of the slider 110 inserted in the rear chamber 144 of the body 130 of the casing 30, and then the holding spring 100 is put on the rear portion of the body 130 so that the rear end of the spring 120 is put on the protrusion 105 of the holding spring 100, and the upper tongue 101 and the lower tongue 106 thereof extend along the outer surfaces of the upper and lower walls of the body 130 of the casing 30, respectively. In this state, the upper lug 103 and the lower lug 107 of the holding spring 100 engage the upper shoulder 138a and the lower shoulder 138b of the body 130, respectively, as shown in FIG. 2, so that the holding spring 100 is unable to be removed from the body 130 of the casing 30. The pressing portion 102 of the upper tongue 101 of the holding spring 100 depresses the locking lever 90 resiliently so that the front end 92 of the locking lever 90 is pressed against the bottom surface of the cam groove 80. The open rear end of the body 130 of the casing 30 is closed by the rear portion 104 of the holding spring 100 as shown in FIGS. 2 and 3.

As shown in FIG. 2, the spring 120 extends between the recess 114 of the slider 110 and the protrusion 105 of the holding spring 100 and is compressed between the bottom of the recess 114 and the front surface of the rear portion 104 of the holding spring 100 to urge the slider 110 resiliently toward the rear surface of the partition wall 132 of the body 130.

The operation of the latching device 10 will be described hereinafter.

Referring to FIGS. 2 and 3, the front portion of the latching member 40 protrudes to the front through the open front end 31 of the casing 30 when the latching device 10 is in the unlocking state. When the latching member 40 is pushed into the body 130 by the striker 20, the striker 20 is caught by the elastic catch 43. When the latching member 40 is pushed into the body 130 by the striker 20, the holding portion 42 is retracted entirely into the front chamber 143. As the latching member 40 moves backward, the front end 92 of the locking lever 90 moves relative to the latching member 40 and advances from the lead-in section 82 to the curved first section 83. Although the shallowest end 87a of the curved second section 87 joins to the middle of the lead-in section 82, the front end 92 of the locking lever 90 is unable to move from the lead-in section 82 into the second section 87 because the lead-in section 82 is deeper than the shallowest end 87a of the second section 87. As the latching member 40 moves further backward, the front end 92 of the locking lever 92 enters the returning section 84.

Figure 8:
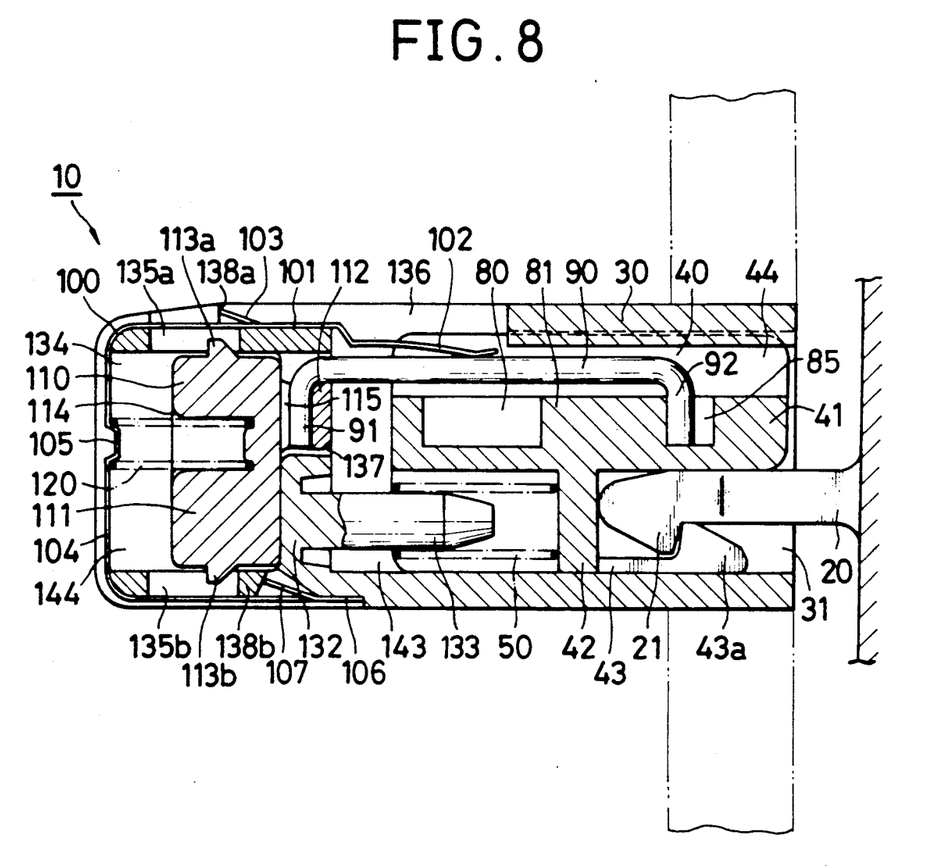
FIG. 8 is a longitudinal sectional view of an essential portion of the latching device in a locking state.
Figure 9:
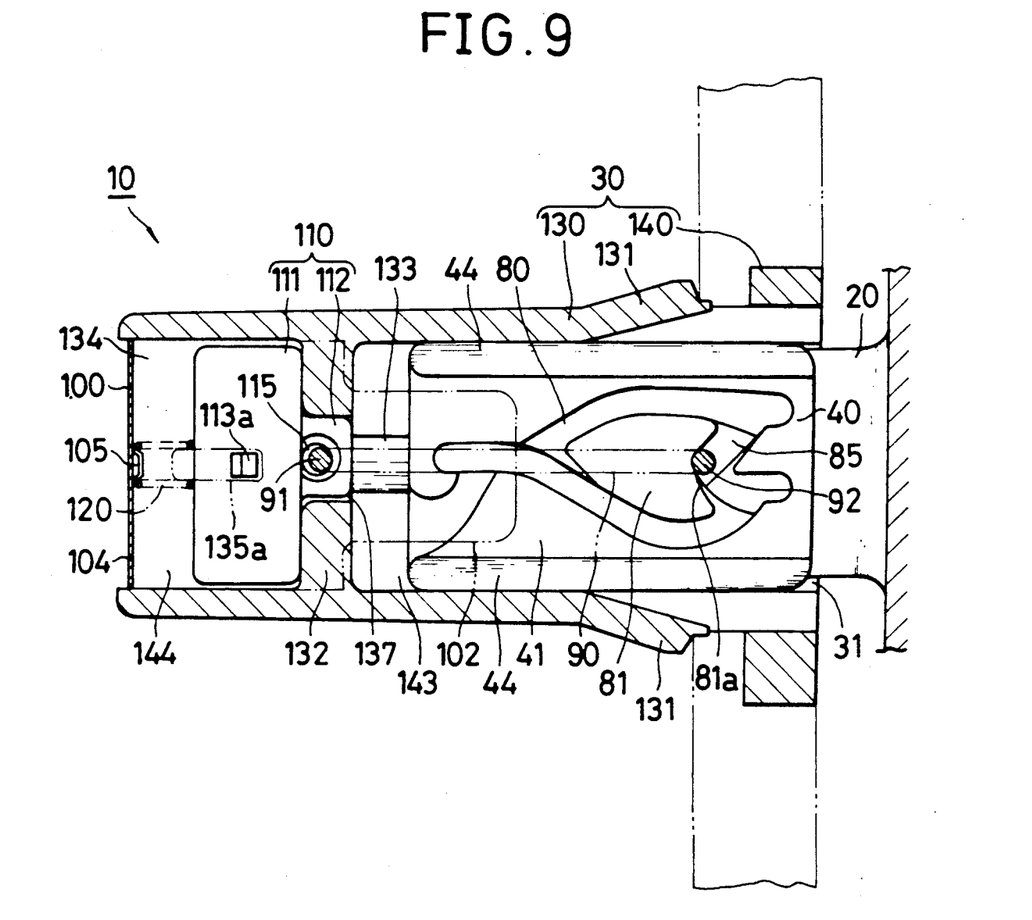
FIG. 9 is a cross-sectional view taken in FIG. 8.

The backward movement of the latching member 40 is stopped upon the abutment of the rear end of the latching member 40 on the front surface of the partition wall 132 of the body 130 of the casing 30. Accordingly, the latching member 40 is pushed back toward the front by the resilience of the compression spring 50 when the pressure applied to the striker 20 is removed. Then, the front end 92 of the locking lever 90 moves in the reverse direction along the returning section 84 and reaches the locking section 85 as shown in FIGS. 8 and 9. Once the front end 92 of the locking lever 90 reaches the locking section 85, the front end 92 is unable to return to the first section 83 because the locking section 85 is deeper than the shallowest end 83a of the first section 83. In this state, the front end 92 of the locking lever 90 engages the recess 81a of the heart-shaped land 81 as shown in FIGS. 8 and 9 to lock the latching member 40 in place against the resilience of the compression spring 50.

As the latching member 40 is moved backward into the body 130 of the casing 30, the elastic catch 43 extending below the lower surface of the bottom wall of the casing 30 is raised by the front edge of the bottom wall of the body 130 of the casing 30, so that the striker 20 is held between the lower surface of the flat portion 41 and the upper surface of the elastic catch 43, and the hook 43a of the elastic catch 43 and the hook 21 of the striker 20 are engaged when the latching member 40 is retracted into the front chamber 143 of the body 130 as shown in FIG. 8. In this locking state, the striker 20 is retained in the front chamber 143 of the body 130 of the casing 30 by the latching member 40.

In releasing the striker 20 from the latching device 10, the striker 20 is pushed to push the latching member 40 further backward in the body 130. When the latching member 40 is thus pushed backward in the front chamber 143, the front end 92 of the locking lever 90 moves from the locking section 85 into the escaping section 86 on the other side of the heart-shaped land 81. Since the locking section 85 is deeper than the returning section 84, the front end 92 of the locking lever 90 is unable to move into the returning section 84. Finally, the latching member 40 is pressed against the partition wall 132 of the body 130. When the force applied to latching member 40 by the striker 20 is removed in this state, the latching member 40 is moved toward the front by the resilience of the compression spring 50. Then, the front end 92 of the locking lever 90 moves in the reverse direction relative to the latching member 40 from the escaping section 86 into the second section 87. Since the escaping section 86 is deeper than the locking section 85, the front end 92 of the locking lever 90 is unable to return to the locking section 85 in moving in the reverse direction. The latching member 40 is moved further toward the front by the resilience of the compression spring 50 until the front portion of the same protrudes from the open front end 31 of the casing 30 as shown in FIGS. 2 and 3.

While the latching member 40 is being moved toward the front, the front end 92 of the locking lever 90 returns from the second section 87 to the lead-in section 82 as shown in FIG. 3 and comes into abutment with the rear end of the lead-in section 82 to restrain the latching member 40 being moved further toward the front by the resilience of the compression spring 50, so that the latching member 40 is held at the frontmost position. When the front portion of the latching member 40 protrudes from the open front end 31 of the body 130, the elastic catch 43 returns elastically to its original position to release the striker 20 as shown in FIG. 2.

The operation of the latching device 10 set in the locking state when the automobile collides against an obstacle will be described hereinafter.

Referring to FIGS. 1 and 10, upon the collision of the automobile against an obstacle, the latching member 40 moves backward in the front chamber 143 of the body 130 of the casing 30 against the resilience of the compression spring 50, compressing the compression spring 50 by its inertial force. At the same time, the slider 110 moves backward in the rear chamber 144 of the body 130 of the casing 30 against the resilience of the spring 120, compressing the spring 120 by its inertial force. Since the locking lever 90 is supported at its rear end 91 on the front portion 112 of the slider 110, the front end 92 of the locking lever 90 moves backward.

Accordingly, the front end 92 of the locking lever 90 resting in the locking section 85 of the cam groove 80 moves backward relative to the casing 30 together with the slider 110 as the latching member 40, hence the locking section 85 of the cam groove 80, moves backward relative to the casing 30 and, consequently, the position of the front end 92 of the locking lever 90 relative to the locking section 85 of the cam groove 80 remains unchanged, so that the locking mechanism 60 remains in the locking state even if the latching member 40 moves backward relative to the casing 30.

Thus the latching device 10 combined with a sliding ashtray or a sliding container provided on the instrument panel, not shown, of an automobile prevents the protrusion of the sliding ashtray or the sliding container into the passenger compartment in case of accidental collision, which secures the passengers effectively against injuries.

The safety mechanism 70 becomes effective when the inertial force of the latching member 40 exceeds, for example, 30 G. During normal acceleration or deceleration, the safety mechanism 70 remains inoperative to enable the locking mechanism 60 to be disengaged optionally.

Figure 11:
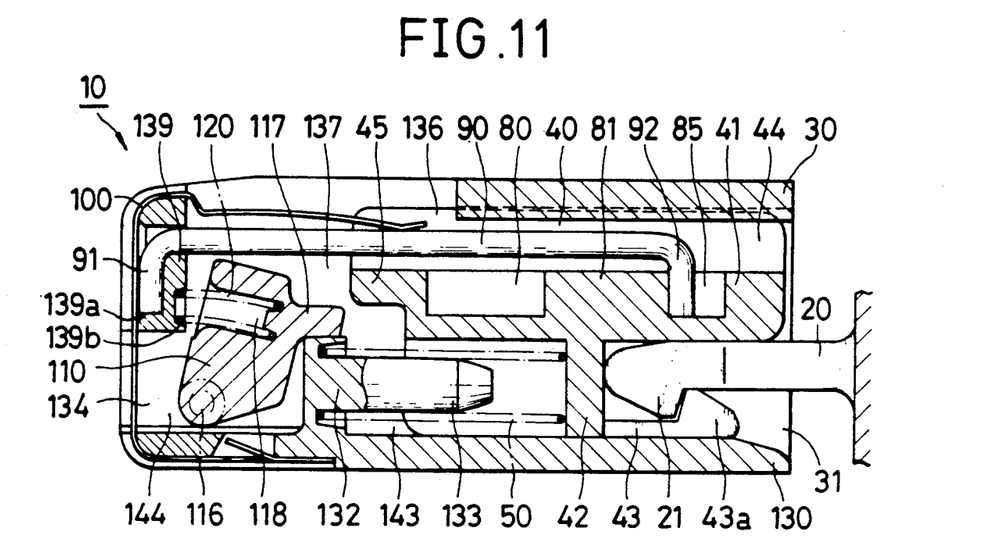
FIG. 11 is a longitudinal sectional view of an essential portion of the latching device in a locking state.
Figure 12:
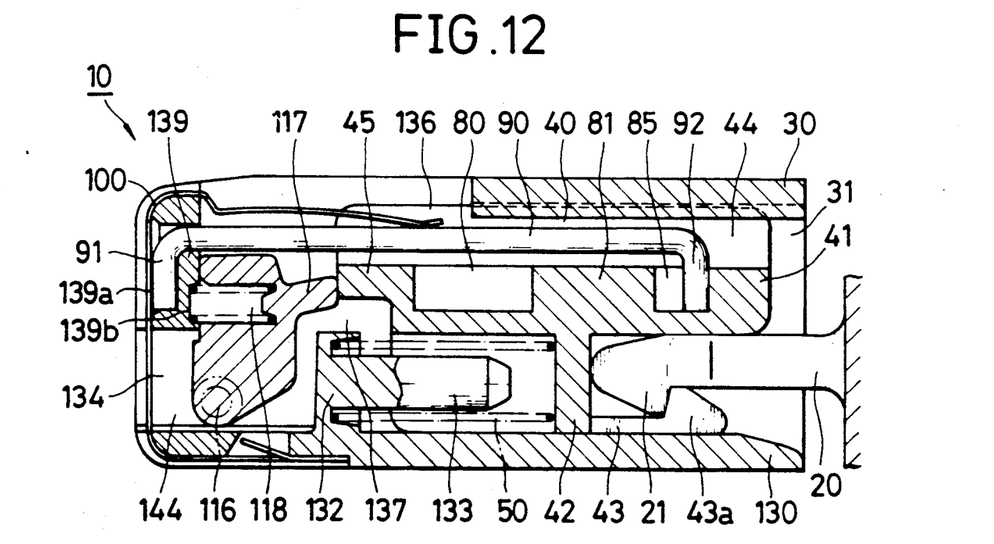
FIG. 12 is a longitudinal sectional view of an essential portion of the latching device in a state subjected to the action of inertial force.

FIGS. 11 and 12 show a latching device 10 in a second embodiment according to the present invention, in which parts like or corresponding to those previously described with reference to FIGS. 1 to 10 are denoted by the same reference characters and the description thereof will be omitted.

The latching device 10 in the second embodiment is featured by a safety mechanism 70 employing a rocking member 110 pivotally supported for rocking motion within the body 30 of a casing 30 so as to be brought into contact by inertia with a latching member 40 to prevent the movement of the latching member 40 from a locking position to an unlocking position. Referring to FIG. 11, the rocking member 110, as movable member is supported pivotally for swing motion between a front position and a rear position on a pin 116 in the rear chamber 44 of the body 130 of the casing 30. The rocking member 10 is provided with a finger 117 protruding from the upper portion of its front surface into an opening 137 so as to engage the latching member 40, and a recess 118 for receiving one end of a spring 120 at a position corresponding to the finger 117. The body 130 has a rear end wall 139 closing the upper half of the open rear end thereof. A hole 139a for receiving the rear end 91 of a locking lever 90 is formed in the rear end wall 139, and a comparatively shallow recess 139b for receiving the other end of the spring 120 is formed in the inner surface of the rear end wall 139. The spring 120 is compressed between the rear end wall 139 of the body 130 and the rocking member 110 with its opposite ends received respectively in the recess 118 of the rocking member 110 and the recess 139b of the rear end wall 139 to bias the rocking member 110 in a clockwise direction, as viewed in FIGS. 11 and 12 by its resilience. The clockwise turning of the rocking member 110 on the pin 116 is limited by the abutment of the finger 117 thereof on the upper surface of a partition wall 132.

As shown in FIG. 11, the latching member 40 has a rear extension 45 projecting from the rear end of the main portion thereof. When the latching member moves backward, the extension 45 protrudes from the front chamber 143 of the body 130 of the casing 30 into the opening 137. In the normal state, the rocking member 110 is held at the frontmost position as shown in FIG. 11 and the extension 45 of the latching member 40 extends over the finger 117, so that the extension 45 and the finger 117 do not collide against each other.

The operation of the latching device 10 in a locking state when inertial forces are produced in the striker 20 and the components of the latching device due to the collision of the automobile against an obstacle will be described hereinafter.

Referring to FIG. 12, the latching member 40 tends to move backward in the front chamber 143 of the body 130 of the casing 30 by inertia or by being pushed by the striker 20 against the resilience of the compression spring 50. At the same time, the rocking member 110 turns counterclockwise, as viewed in FIG. 12, on the pin 116 by inertia against the resilience of the spring 120. Then, the finger 117 of the rocking member 110 is located on a path along which the extension 45 of the latching member 40 moves backward, so that the backward movement of the latching member 40 is checked upon the collision of the rear end of the extension 45 of the latching member 40 against the front end of the finger 117 of the rocking member 110. Consequently, the front end 92 of the locking lever 90 is unable to move from the locking section 85 to the escape section 86 of the cam groove 80, so that the locking mechanism 60 remains in a locking state.

Being capable of preventing the backward movement of the latching member 40, the safety mechanism 70 employed in this embodiment can be used in a latching device provided with a locking mechanism comprising a rotary cam, such as disclosed in Japanese Utility Model Laid-open (Kokai) No. Sho 60-11977 as well as to the latching device provided with the locking mechanism 60 employing the locking lever 90 and the heart-shaped cam groove 80 formed in the latching member 40 of the latching device.

The striker 20 and the latching member 40 may be of any suitable shapes other than those shown in the drawings, provided that the latching member 40 is able to catch the striker 20 when the same is at the locking position and the same is able to release the striker 20 when the same is at the unlocking position. For example, the present invention may employ, in combination, a striker, and a latching member that holds the striker therebetween (Japanese Utility Model Laid-open (Kokai) No. Sho 60-11977), a striker, and a latching member respectively having hooks that engage (Japanese Utility Model Laid-open (Kokai) No. Hei 1-163682) or a striker, and a latching member that engage magnetically.

As the present invention may be embodied in several forms without departing from the spirit of essential characteristics thereof, the foregoing embodiments are therefore illustrative and not restrictive. It is therefore to be understood that the present invention may be practiced otherwise than as specifically described herein without departing from the scope and spirit thereof.

What is claimed is:

1. a latching device for a vehicle, comprising:

a hollow casing having open front and rear ends;

a latching member supported for sliding motion within the casing so as to protrude through the open front end of the casing;

biasing means for biasing the latching member toward the open front end so that the latching member protrudes outside through the open front end of the casing;

a locking mechanism capable of locking the latching member at a locking position within the casing against the biasing force of the biasing means and of unlocking the latching member when the latching member is pushed from the locking position against the biasing force of the biasing means to an unlocking position within the casing; and a safety mechanism capable of preventing the disengagement of the locking mechanism by inertia;

the locking mechanism comprises a locking lever that engages a heart-shaped cam groove formed in the latching member; and the safety mechanism comprises a movable member pivotally supporting the locking lever and supported for sliding in the direction of sliding movement of the latching member within the casing and capable of moving by inertia in the direction of sliding movement of the latching member, and spring means biasing the movable member toward the latching member.

2. A latching device for a vehicle according to claim 1, wherein said casing has a body having the shape of a rectangular tube, and flanges extending from the outer surfaces of the opposite side walls of the body at the open front end, and said casing is formed of a thermoplastic resin having moderate rigidity and moderate elasticity in an integral member.

3. A latching device for a vehicle according to claim 2, wherein the body of said casing is provided with a pair of elastic lugs extending slopewise from the outer surfaces of the opposite side walls thereof toward the backsides of the flanges, respectively, and said casing is fastened to a fixed member of the vehicle with the elastic lugs.

4. A latching device for a vehicle according to claim 2, wherein the body of said casing is provided internally with a partition wall dividing the interior thereof into a front chamber and a rear chamber, said latching member is received slidably in the front chamber on the side of the open front end, and the movable member of said safety mechanism is received slidably in the rear chamber.

5. A latching mechanism for a vehicle according to claim 1, wherein said latching member has an upper flat portion provided in its upper surface with the cam groove, a holding portion extending downward from the lower surface of the rear half of the flat portion in a shape resembling a U-shaped frame opening toward the rear so as to receive the front end of said biasing means, and an elastic catch having a U-shaped front portion, extending obliquely toward the front from the lower surface of the flat portion so as to extend obliquely downward beyond a plane including the outer surface of the bottom wall of the casing, and said latching member is formed of a thermoplastic resin having moderate rigidity and moderate elasticity in an integral member.

6. A latching device for a vehicle according to claim 1, wherein said cam groove is formed in the upper surface of the flat portion of said latching member in a heart-shape to define a heart-shaped land having a substantially U-shaped recess in the central portion of the front end thereof on the side of the front end of the latching member, and a substantially V-shaped rear end tapering toward the rear and formed on the side of the rear end of the latching member.

7. A latching device for a vehicle according to claim 1, wherein the cam groove consists of a lead-in section substantially linearly extending toward the front to the V-shaped rear end of the heart-shaped land, a first section extending on one side of the heart-shaped land toward the front in a curve from the lead-in section and reducing its depth toward its front end, a returning section extending from the shallowest front end of the first section beyond the U-shaped front end of the heart-shaped land, having a depth greater than that of the shallowest front end of the first section, and having a closed front end, a locking section having a shape conforming to the U-shaped front end of the heart-shaped land and a depth greater than that of the returning section, and contiguous with the returning section, an escaping section contiguous with the locking section, having a depth greater than that of the locking section, extending toward the front beyond the U-shaped front end of the heart-shaped land, and having a closed front end, and a second section extending from the escaping section toward the lead-in section in a curve on the other side of the heart-shaped land, and reducing its depth toward its rear end, a guide groove is branched from the middle of the lead-in section, the guide groove has one end opening in the end surface of the rear end of said latching member, and the other end joined to the middle of the lead-in section and having a depth smaller than that of the lead-in section.

8. A latching device for a vehicle according to claim 1, wherein said locking lever is a round metal wire, has opposite ends bent in the shape resembling the letter L, and is supported pivotally at its rear end on said movable member with its front end engaging the cam groove.

9. A latching device for a vehicle according to claim 1, wherein said movable member is a comparatively heavy member formed of a metal.

10. A latching device for a vehicle according to claim 1, wherein said movable member has a rear portion slidably received in the rear chamber of said casing, and a front portion protruding toward the front from the upper portion of the front surface of the rear portion and pivotally supporting said locking lever at its rear end.

11. A latching device for a vehicle according to claim 1, wherein said spring means biasing said movable member toward said latching member is a coil spring.

12. A latching device for a vehicle according to claim 1, wherein said movable member is provided with guide projections having the shape of a sawtooth and projecting in opposite directions from the upper and lower surfaces of the rear portion thereof, respectively, and a recess in the rear surface thereof to receive one end of said spring.

13. A latching device for a vehicle according to claim 1, wherein said movable member is provided in its front portion with a vertical through hole having a diameter greater than that of the rear end of said locking lever, the rear end of said locking lever is inserted in the through hole so that said locking lever is able to turn about the through hole and able to incline relative to said movable member.

14. A latching device for a vehicle, comprising:
a hollow casing having open front and rear ends ;
a latching member supported for sliding motion within the casing so as to protrude through the open front end of the casing;
biasing means for biasing the latching member toward the open front end so that the latching member protrudes outside through the open front end of the casing;
a locking mechanism capable of locking the latching member at a locking position within the casing against the biasing force of the biasing means and of unlocking the latching member when the latching member is pushed from the locking position against the biasing force of the biasing means to an unlocking position within the casing; and
a safety mechanism capable of preventing the disengagement of the locking mechanism by inertia;
the safety mechanism comprises a movable member pivotally supported within the casing, capable of turning toward and away from the latching member and of turning by inertia to a position where the same is located on a path along which the latching member moves to check the movement of the latching member from the locking position to the unlocking position, and biasing means for biasing the movable member to a position where the movable member remains disengaged from the latching member.

15. A latching device for a vehicle according to claim 14, wherein said movable member is supported pivotally for turning motion toward the front and toward the rear in the rear chamber of the body of said casing, and provided in the upper portion of the front surface thereof with a finger protruding into an opening formed in the partition wall and capable of being located on the path of backward movement of the latching member, and in its rear surface with a recess for receiving the front end of a spring at a position corresponding to the finger.

16. A latching device For a vehicle according to claim 14, wherein the body of said casing is provided at its rear end with a rear end wall closing the upper half of the open rear end, a hole for receiving the rear end of said locking lever is formed in the rear end wall, a comparatively shallow recess for receiving the rear end of the spring is formed in the front surface of the rear end wall, the spring is compressed between the bottom surface of the recess of said movable member and the bottom surface of the recess of the rear end wall of the body of said casing to turn said movable member about its axis of turning motion by its resilience so that said movable member is biased to a front position where the finger of said movable member is retracted from the path along which said latching member moves backward.

17. A latching device for a vehicle according to claim 14, wherein said latching member has a rear extension extending to the rear, the extension protrudes from the front chamber of said casing into the opening of the partition wall, and the movable member remains at the front position and the extension of said latching member extends in a plane above the finger of said movable member so that the extension and the finger do not collide each other during the normal acceleration and during the normal deceleration of the vehicle.

* * * * *